(12) United States Patent
Chakraborty et al.

(10) Patent No.: US 12,450,692 B2
(45) Date of Patent: Oct. 21, 2025

(54) RECONSTRUCTING LINEAR GRADIENTS

(71) Applicant: Adobe Inc., San Jose, CA (US)

(72) Inventors: Souymodip Chakraborty, Bangalore (IN); Vineet Batra, Delhi (IN); Michal Lukáč, Boulder Creek, CA (US); Matthew David Fisher, San Carlos, CA (US); Ankit Phogat, Noida (IN)

(73) Assignee: Adobe Inc., San Jose, CA (US)

( * ) Notice: Subject to any disclaimer, the term of this patent is extended or adjusted under 35 U.S.C. 154(b) by 401 days.

(21) Appl. No.: 17/901,583

(22) Filed: Sep. 1, 2022

(65) Prior Publication Data
US 2024/0087089 A1 Mar. 14, 2024

(51) Int. Cl.
*G06T 7/90* (2017.01)
*G06T 3/60* (2006.01)
*G06T 5/20* (2006.01)

(52) U.S. Cl.
CPC .............. *G06T 3/60* (2013.01); *G06T 5/20* (2013.01); *G06T 2207/10024* (2013.01); *G06T 2207/20076* (2013.01)

(58) Field of Classification Search
CPC ... G06T 3/60; G06T 5/20; G06T 2207/10024; G06T 2207/20076; G06T 7/90
See application file for complete search history.

(56) References Cited

U.S. PATENT DOCUMENTS

| 6,343,146 B1 | 1/2002 | Tsuruoka et al. |
| 6,784,896 B1 | 8/2004 | Perani et al. |
| 6,879,327 B1 | 4/2005 | Mathur et al. |

(Continued)

FOREIGN PATENT DOCUMENTS

| CN | 103854020 A | * | 6/2014 | |
| WO | 2020/079355 A1 | | 4/2020 | |
| WO | WO-2021155153 A1 | * | 8/2021 | ............. G06V 10/56 |

OTHER PUBLICATIONS

Phornphatcharaphong, W.; Eua-Anant, N. Edge-Based Color Image Segmentation Using Particle Motion in a Vector Image Field Derived from Local Color Distance Images. J. Imaging 2020, 6, 72. https://doi.org/10.3390/jimaging6070072 (Year: 2020).*

(Continued)

*Primary Examiner* — Stephen R Koziol
*Assistant Examiner* — Dylan J Sherrillo
(74) *Attorney, Agent, or Firm* — Nicholson De Vos Webster & Elliott LLP

(57) ABSTRACT

Embodiments are disclosed for reconstructing linear gradients from an input image that can be applied to another image. In particular, in one or more embodiments, the disclosed systems and methods comprise receiving a raster image, the raster image including a representation of a linear color gradient. The disclosed systems and methods further comprise determining a vector representing a direction of the linear color gradient. The disclosed systems and methods further comprise analyzing pixel points along the direction of the linear color gradient to compute color stops of the linear color gradient. The disclosed systems and methods further comprise generating an output color gradient vector with the computed color stops of the linear color gradient, the output color gradient vector to be applied to a vector graphic.

20 Claims, 12 Drawing Sheets
(6 of 12 Drawing Sheet(s) Filed in Color)

(56) References Cited

U.S. PATENT DOCUMENTS

| | | | |
|---|---|---|---|
| 8,055,065 B2* | 11/2011 | Allen | G06T 9/20 |
| | | | 382/162 |
| 8,773,423 B2* | 7/2014 | Sun | G06T 17/20 |
| | | | 345/419 |
| 12,340,441 B2 | 6/2025 | Lukac et al. | |
| 2009/0244630 A1 | 10/2009 | Miyazaki | |
| 2012/0288188 A1 | 11/2012 | Oto | |
| 2016/0062731 A1 | 3/2016 | Lin et al. | |
| 2019/0102914 A1 | 4/2019 | Stefanov | |
| 2021/0150776 A1 | 5/2021 | Biswas et al. | |

OTHER PUBLICATIONS

Dhariyal B. et al., "An Examination of the State-of-the-Art for Multivariate Time Series Classification," 020 International Conference on Data Mining Workshops (ICDMW), Nov. 2020, pp. 243-250.

Favreau J.-D. et al., "Photo2clipart: Image Abstraction and Vectorization Using Layered Linear Gradients," ACM Trans. Graph., 36, 6, Article 180 (Dec. 2017), 11 pages.

Kansal, R. et al., "A vectorization framework for constant and linear gradient filled regions," Vis. Comput., 31(5), (May 2015, pp. 717-732.

Lecot, G. et al., "ARDECO: Automatic region detection and conversion," Proceedings of the 17th Eurographics Conference on Rendering Techniques, EGSR '06, (Jun. 2006), p. 349-360.

Orzan, A. et al., "Diffusion Curves: A Vector Representation for Smooth-Shaded Images," Commun. ACM, vol. 56, No. 7, (Jul. 2013), pp. 101-108.

Sun, J. et al., "Image Vectorization using Optimized Gradient Meshes," ACM Transactions on Graphics, vol. 26, No. 3, Article 11, (Jul. 2007), pp. 11-1-11-7.

U.S. Patent Application for "Reconstructing Concentric Radial Gradients," filed Aug. 31, 2022., U.S. Appl. No. 17/823,574.

E. Nezhadarya and R. K. Ward, "A New Scheme for Robust Gradient Vector Estimation in Color Images," in IEEE Transactions on Image Processing, vol. 20, No. 8, pp. 2211-2220, Aug. 2011, doi: 10.1109/TIP.2011.2118217. (Year: 2011).

Non-Final Office Action, U.S. Appl. No. 17/823,574, Nov. 4, 2024, 39 pages.

Notice of Allowance, U.S. Appl. No. 17/823,574, Mar. 12, 2025, 11 pages.

Office Action dated Oct. 2, 2024 in related U.S. Appl. No. 18/051,648.

* cited by examiner

RED GRADIENT FIELD 302
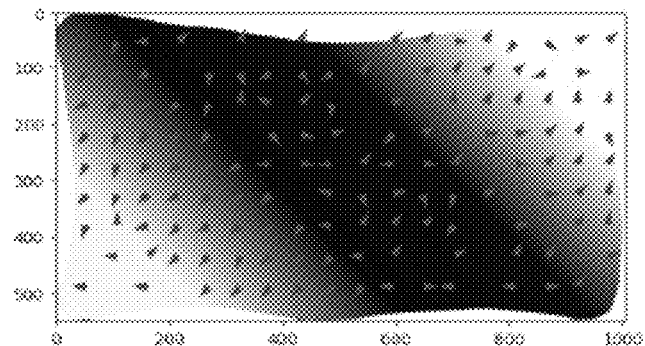
GREEN GRADIENT FIELD 304
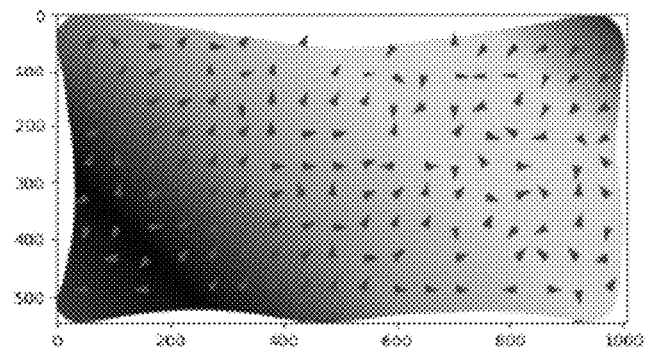
BLUE GRADIENT FIELD 306
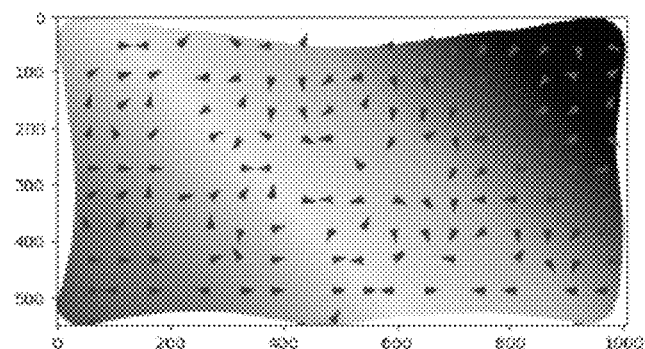
FIG. 3

1000

RECEIVING A REQUEST TO CONVERT A RASTER IMAGE TO A VECTOR GRAPHIC 1002

IDENTIFYING A REGION OF THE RASTER IMAGE, THE REGION INCLUDING A REPRESENTATION OF A LINEAR COLOR GRADIENT 1004

COMPUTING COLOR STOPS OF THE LINEAR COLOR GRADIENT BASED ON A VECTOR REPRESENTING A DIRECTION OF THE LINEAR COLOR GRADIENT, AND PIXEL POINTS ALONG THE DIRECTION OF THE LINEAR COLOR GRADIENT 1006

CREATING A VECTOR GRAPHIC INCLUDING THE LINEAR COLOR GRADIENT USING THE COMPUTED COLOR STOPS 1008

*FIG. 10*

RECONSTRUCTING LINEAR GRADIENTS

BACKGROUND

Computing devices (e.g., computers, tablets, smart phones) provide numerous ways for users to capture, create, share, view, and otherwise edit numerous types of digital content, including images. One example is the ability to create linear gradients on images or objects. A linear gradient can be defined by an axis, a gradient vector, and two or more color stop locations. Gradients allow designers to create smooth shaded graphics that would be difficult to create using only solid filled paths.

Image vectorization techniques have been applied to reproduce existing linear gradients. However, these existing solutions have limitations and drawbacks, as they can be resource-intensive, while producing less accurate reproductions as outputs.

SUMMARY

Introduced here are techniques/technologies that allow a digital design system to reconstruct linear gradients from an input image (e.g., a raster image). The output of the digital design system can be a fully rendered version of the reconstructed linear gradient, or the vector information (e.g., the direction and color stops) that can be used when needed to render the reconstructed linear gradient. The reconstructed linear gradient can then be applied to a new image (e.g., a vector graphic).

In particular, in one or more embodiments, a digital design system can receive an input raster image that includes a representation of a linear color gradient as an input. The digital design system can then determine a vector representing a direction of the linear color gradient. The digital design system can then analyze pixel points along the direction of the linear color gradient to generate color channel data for the linear color gradient and use the color channel data to compute the colors stop locations, and corresponding color values, that best reproduce the linear color gradient of the input raster image. The digital design system can then use the computed color stop locations to generate an output color gradient vector that can be used to generate a reproduction of the linear color gradient on another image.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying drawings in which:

FIG. 3 illustrates color channel gradient vector fields in accordance with one or more embodiments;

FIG. 10 illustrates a flowchart of a series of acts in a method of reconstructing a linear gradient from a raster image by a digital design system in accordance with one or more embodiments.

DETAILED DESCRIPTION

Figure 1:
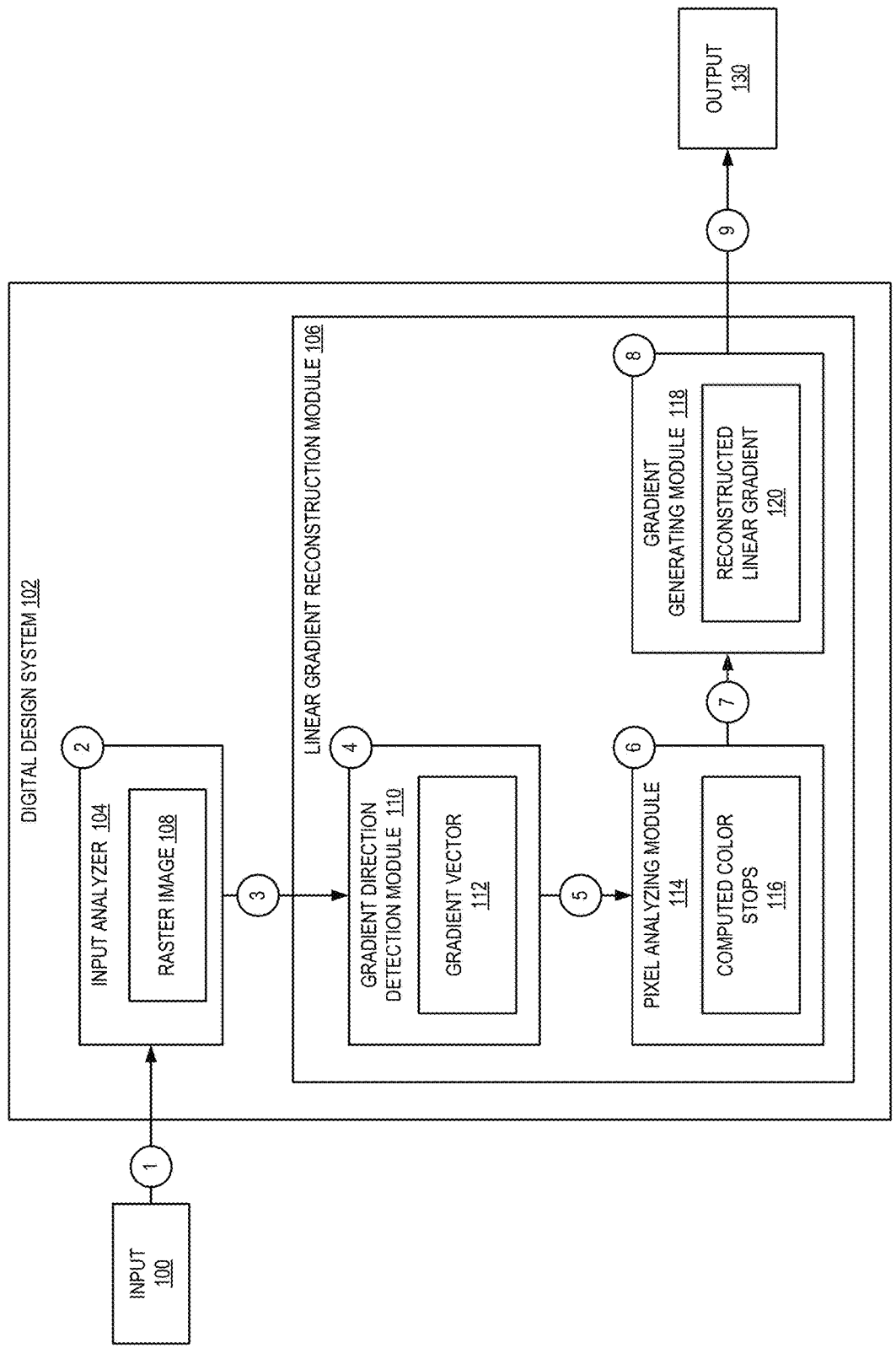
FIG. 1 illustrates a diagram of a process of reconstructing a linear gradient from an input image in accordance with one or more embodiments.

One or more embodiments of the present disclosure include a digital design system for reconstructing linear gradients from an input image that can be modified and/or applied to another image or object. While existing solutions perform gradient reconstruction by converting entire images to vectors, they have limitations and disadvantages.

One existing solution is based on image vectorization technique which traditionally produce solid filled paths when extracting vector graphics from an image. However, a limitation common to such approaches is that they are only able to create a two color stop gradient, which can be very limiting and cannot produce accurate linear gradient reproductions as many linear gradients are based on more than two colors. In some such solutions, two color stops at the boundary of the gradient region along a direction of the gradient are determined and only random samples are taken within the gradient region. Further, some existing image vectorization techniques reconstruct linear gradients by generating solid filled regions (e.g., rows or columns of pixels) of single colors. If the gradient goes through a large number of color changes, this can result in a large number of discrete regions, each representing a different color. As the output can include dozens, or hundreds, of discrete regions depending on the number of color changes in the gradient, these solutions require increased resource usage to generate, store, and use the generated data to re-render a linear gradient. The results of existing image vectorization techniques also have limited uses as they cannot be edited or modified because of the complicated geometry created to represent each color region. Further, some existing techniques generate linear gradient reproductions that cannot be exported out of the native application in which they were created.

Other solutions include manual reproduction of a linear gradient by a user. These solutions involve the user defining a gradient direction and color stop locations. While these solutions can allow for more than two color stops, they can also involve significant trial and error and thus be time-consuming to achieve an accurate color gradient reproduction.

To address these issues, the digital design system receives a raster image as an input that includes a linear gradient. The linear gradient can be entire image or be an identified portion of the image. Once the linear gradient is identified, the digital design system generates color channel data for the raster image to identify a direction for the linear gradient. Color channel data includes vector fields for each of the three color channels (red, green, and blue), where the vector fields include directional information for each pixel, or group of pixels. The directional information indicates directions of change of intensity of a corresponding color channel. The digital design system can combine the directional information for the three color channels and find a single direction that most closely aligns to the directions of change of intensities for the three color channels. That single direction determined from the vector fields represents the direction of the linear gradient of the input image and can be described as a gradient vector at an angle, θ, with respect to a coordinate axis (e.g., the x-axis).

After the gradient vector is determined, the color values of points along the direction of the gradient vector are determined to compute the color stops that can reconstruct or reproduce the linear gradient. In some embodiments, the digital design system can rotate the input image such that the direction of the gradient vector is aligned (e.g., parallel) to the positive x-axis. In such embodiments, the pixel columns at each point along the gradient direction with be parallel to the y-axis. The digital design system can then determine the color values for each pixel in a pixel column and calculate an average pixel color value for the pixel column. As the gradient vector is the direction of the linear gradient, at each point along the gradient direction, any pixels in a line perpendicular to the gradient vector (e.g., a pixel column) is expected to have the same or similar color values. However, analyzing the pixels in each pixel column can account for any variations in the colors of pixels in a pixel column.

Color channel data for each color channel can then be generated from the average pixel color values. For example, for each pixel point along the direction of the linear gradient, the average pixel color for the pixel column corresponding to the pixel point can be broken up into separate RGB channel data. The digital design system can then identify the locations of sharp changes in the color values as the preliminary or candidate set of color stop locations. The candidate set of color stop locations can then be reduced by identifying any color stop locations that are co-linear to neighboring color stops (e.g., the color at the color stop can be generated by interpolating the surrounding color stops. Using the gradient vector and the final set of color stop locations, the digital design system can generate an output. The output can be a vector with the color stop locations that can be used to generate the reconstructed linear gradient at a later time, or the output can be a vector graphic or raster image with the reconstructed linear gradient.

The embodiments described herein produce a more accurate reconstruction of a linear gradient, while utilizing fewer computing resources. For example, by determining a set of color stops representing the linear gradient in an input image and minimizing the set of color stops, embodiments can produce a more accurate linear gradient reproduction and utilize fewer computing resources versus image vectorization techniques. Further, embodiments described herein can produce a more accurate linear gradient reconstruction by identifying the locations of color stops that best reproduces the linear gradient versus existing solutions that can only generate a linear gradient with at most two color stops.

FIG. 1 illustrates a diagram of a process of reconstructing a linear gradient from an input image in accordance with one or more embodiments. As shown in FIG. 1, the digital design system 102 receives an input 100, as shown at numeral 1. For example, the digital design system 102 receives the input 100 from a user via a computing device or from a memory or storage location. In one or more embodiments, the input 100 includes a raster image that includes a color gradient. As illustrated in FIG. 1, the digital design system 102 includes an input analyzer 104 that receives the input 100.

Figure 2:
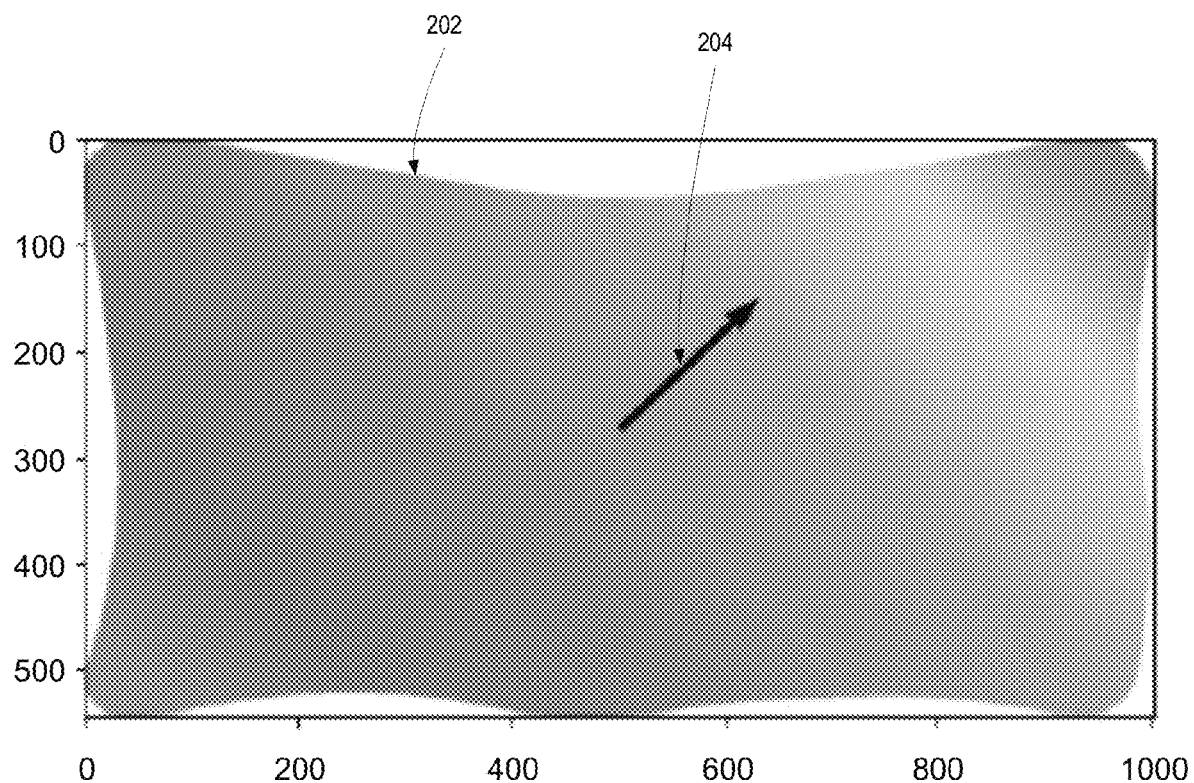
FIG. 2 illustrates an example raster image with a linear gradient in accordance with one or more embodiments.

As illustrated in FIG. 1, the digital design system 102 includes an input analyzer 104 that receives the input 100. In some embodiments, the input analyzer 104 analyzes the input 100, at numeral 2, to identify a raster image 108. FIG. 2 illustrates an example raster image with a linear gradient in accordance with one or more embodiments. As depicted in FIG. 2, a raster image 202 with approximate dimensions of 550 pixels×1000 pixels includes a linear gradient. The raster image 202 can be the entire image provided in an input (e.g., input 100) or a selected portion of image provided in an input. In other embodiments, an algorithm can be used to identify and select a region of the raster image that includes a linear gradient. Returning to FIG. 1, after the input analyzer 104 analyzes the input 100 and extracts the raster image 108, the raster image 108 is sent to a gradient direction detection module 110 of a linear gradient reconstruction module 106, as shown at numeral 3. In one or more other embodiments, the input analyzer 104 optionally stores the raster image 108 in a memory or storage location for later access (e.g., by the linear gradient reconstruction module 106).

In one or more embodiments, the gradient direction detection module 110 is configured to determine the direction of the gradient in the raster image 108, at numeral 4. The determined direction of the gradient can be represented by a gradient vector 112 generated by the gradient direction detection module 110. In one or more embodiments, the gradient direction detection module 110 first determines whether the raster image 108 includes a linear gradient. The gradient direction detection module 110 can segment the raster image into one or more superpixels, where a superpixel, $\mathfrak{S}$ is a closed, compact of set of points in $\mathbb{R}^2$ space. Each superpixel of the raster image can be a defined area for which a single gradient is to be approximated by the digital design system. The color of a pixel, $p \in \mathfrak{S}$ is $C(p)=[C_R\ C_G\ C_B]$ defined by the three color channels: red, green, and blue. If the colors of the superpixel are defined by a linear gradient, then the direction in which the color intensities of the three color channels should be aligned. The gradient direction detection module 110 determines whether the superpixel color is defined by a solid fill by observing the sample variance, $S^2(C(p))<\epsilon;\ p \in \mathfrak{S}$, as the change in color intensity for a solid fill is negligible. In one or more embodiments, the gradient direction detection module 110 determines that the superpixel is a solid fill color when the change in color intensity is below a threshold value.

After determining that a gradient exists, the gradient direction detection module 110 determines whether the gradient is a linear gradient or a radial gradient. To distinguish between linear and radial gradient, pixel color gradients can be analyzed. In one or more embodiments, the color gradient can be defined as:

$$dC = [\overrightarrow{dC_R}\ \overrightarrow{dC_G}\ \overrightarrow{dC_B}] = \left[\left(\frac{\partial C_R}{\partial x}, \frac{\partial C_R}{\partial y}\right)\left(\frac{\partial C_G}{\partial x}, \frac{\partial C_G}{\partial y}\right)\left(\frac{\partial C_B}{\partial x}, \frac{\partial C_B}{\partial v}\right)\right]$$

This can be calculated numerically using spatial difference operators (e.g., the Sobel operator). Typically, for a linear gradient, the color gradients in all three color channels must be co-linear. The degree of co-linearity between the three color channels can be estimated as follows:

$$E(\vec{d}) = \sum_p (\overrightarrow{dC_R}(p) \cdot \vec{d})^2 + (\overrightarrow{dC_G}(p) \cdot \vec{d})^2 + (\overrightarrow{dC_B}(p) \cdot \vec{d})^2$$

where $\vec{d}$ is a unit vector ($\|\vec{d}\|=1$). When the gradient is a linear gradient, the value of E will tend to 0 when $\vec{d}$ aligns with the gradient direction. The result of $E(\vec{d})$ thus can be an indicator of how well the superpixel can be represented by a linear gradient. When $E(\vec{d})$ is larger than a threshold, then the superpixel cannot be represented by a linear gradient.

After determining that the superpixel can be represented by a linear gradient, the gradient direction detection module 110 determines a gradient vector 112, representing the direction of the linear gradient. Letting theta, θ, be the angle that the vector $\vec{d}$ makes with the positive x-axis, the previous equation can be rewritten as follows:

$$E(\theta) := \sum_p \sum (G_x \cos \theta + G_y (p)\sin \theta)^2$$

where $\mathcal{G}$ is $\{\overrightarrow{dC_R}, \overrightarrow{dC_G}, \overrightarrow{dC_B}\}$ and $G_x$, $G_y$ are the x, y components of the gradient G. E(θ) is the "energy" of the angle θ. For the field directions of the three color channels, all three color channel fields contribute to E(θ). The derivative of E with respect to theta is a quadratic equation, and E becomes minimum for the roots of a quadratic equation:

$$\frac{dE}{d\theta} = 2 \cdot \sum \sum (G_y^2 - G_x^2)\sin \theta \cos \theta - G_y G_x \sin^2 \theta + G_y G_x \cos^2 \theta$$

$$0 = \tan^2 \theta \sum \sum G_y G_x - \tan \theta \sum \sum (G_y^2 - G_x^2) - \sum \sum G_y G_x$$

Minimizing the "energy" of the angle θ represents the best fit where the value of θ results in the minimum E(θ). The optimal angle θ that the vector $\vec{d}$ makes with the positive x-axis can then be defined by solving for θ using the following quadratic formula:

$$\tan \theta = \frac{b \pm \sqrt{b^2 + 4a^2}}{2a}$$

where:

$a = \sum \sum G_y(p), G_x(p)$, and $b = \sum \sum G_y(p)^2 - G_x(p)^2$

FIG. 3 illustrates color channel gradient vector fields in accordance with one or more embodiments. The color channel gradient vector fields correspond to the raster image 202 depicted in FIG. 2. The color channel gradient vector fields indicate directions of change in color intensity for a corresponding color channel. For example, the directions of the arrows in a red gradient field 302 indicates the change in color intensity for the red color channel, the directions of the arrows in a green gradient field 304 indicates the change in color intensity for the green color channel, and the directions of the arrows in a blue gradient field 306 indicates the change in color intensity for the blue color channel. In one or more embodiments, the gradient vector 112 representing the direction of the linear gradient can be determined by combining, or concatenating, the vector fields for each of the color channels and then determining the direction that best matches the direction of the vectors/arrows across the three color channels. As illustrated in FIG. 2, the direction of the linear gradient is indicated by the gradient vector 204.

Returning to FIG. 1, after the gradient direction detection module 110 generates the gradient vector 112, the gradient vector 112 is sent to a pixel analyzing module 114, as shown at numeral 5. In one or more embodiments, the pixel analyzing module 114 determines the computed color stops 116 along the gradient vector 112 that most closely reproduce the linear gradient of the raster image 108, at numeral 6. As the raster image 108 is defined by a linear gradient, then all pixels in a line perpendicular to a point (e.g., a pixel point) along the direction of the gradient vector 112 should have the same, or similar, color values. In one or more embodiments, to reconstruct the color gradient more efficiently, the pixel analyzing module 114 rotates the superpixel until the gradient vector 112 is parallel to the x-axis. Thus, for each pixel point along the direction of the gradient vector 112, the pixels in a corresponding pixel column originating from the pixel point should have the same, or similar, color values. For example, because the angle θ, determined above, is the angle of the gradient vector 112 with the x-axis, rotating the raster image by θ degrees will result in the gradient vector 112 being in parallel with the x-axis.

Figure 4:
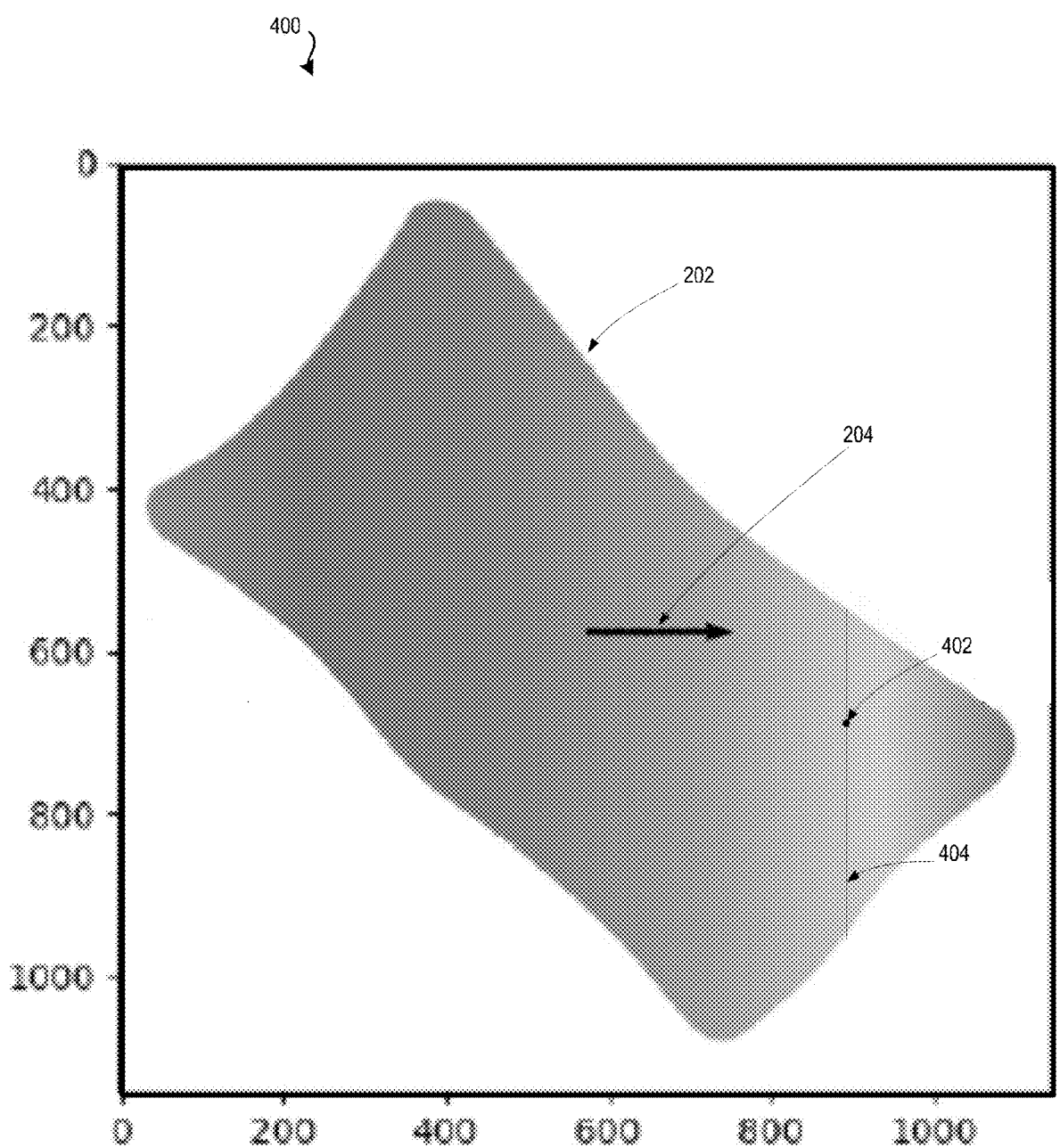
FIG. 4 illustrates a rotated raster image as part of a process of reconstructing a linear gradient in accordance with one or more embodiments.

FIG. 4 illustrates a rotated raster image as part of a process of reconstructing a linear gradient in accordance with one or more embodiments. In FIG. D, a plot 400 depicts the result of rotating the raster image 202 from its original orientation until the gradient vector 204 is parallel to the x-axis. Once rotated, the pixel analyzing module 114 can, for each point along the direction of the gradient vector 204, calculate the average color value for all pixels in a column perpendicular to the direction of the gradient. For example, at point 402, the pixel analyzing module 114 analyzes the pixels in a pixel column 404 that is parallel with the y-axis, and thus perpendicular to the gradient vector 204 after rotation. In one or more embodiments, determining the average color value based on all pixels in the pixel column accounts for any perturbations in the pixel color (e.g., due to noise or anti-aliasing). This process is repeated for each point along the direction of the gradient vector 204, resulting in an average color value for each point (e.g., pixel point) along the direction of the gradient vector 204.

Any two points, $p_0$ and $p_1$, are orthogonal with respect to a gradient vector when $(p_1-p_0)$ is orthogonal to the gradient vector, which can be presented as follow:

$$p_0 \sim p_1 iff (p_1-p_0) \cdot \vec{d} = 0$$

where $\sim$ is an equivalence relation. Letting Ω be the equivalence class, each element of the equivalence class Ω is a line orthogonal to the direction of the gradient vector. A total order can then be defined on Ω by the order at which the elements (e.g., line) of Ω intersects the x-axis (or to the y-axis if the gradient vector is parallel to the y-axis and perpendicular to the x-axis). A color profile function, $F:\Omega \to \mathbb{R}^3$:

$$F([p]) := \sum_{p' \in [p]} C(p') \cdot \frac{1}{\|[p]\|}$$

When the raster image is rotated to align the direction of the gradient vector with the positive x-axis, f([p]) is then just the average color of the pixels in a column perpendicular to the to the direction of the gradient at pixel p.

Figure 5:
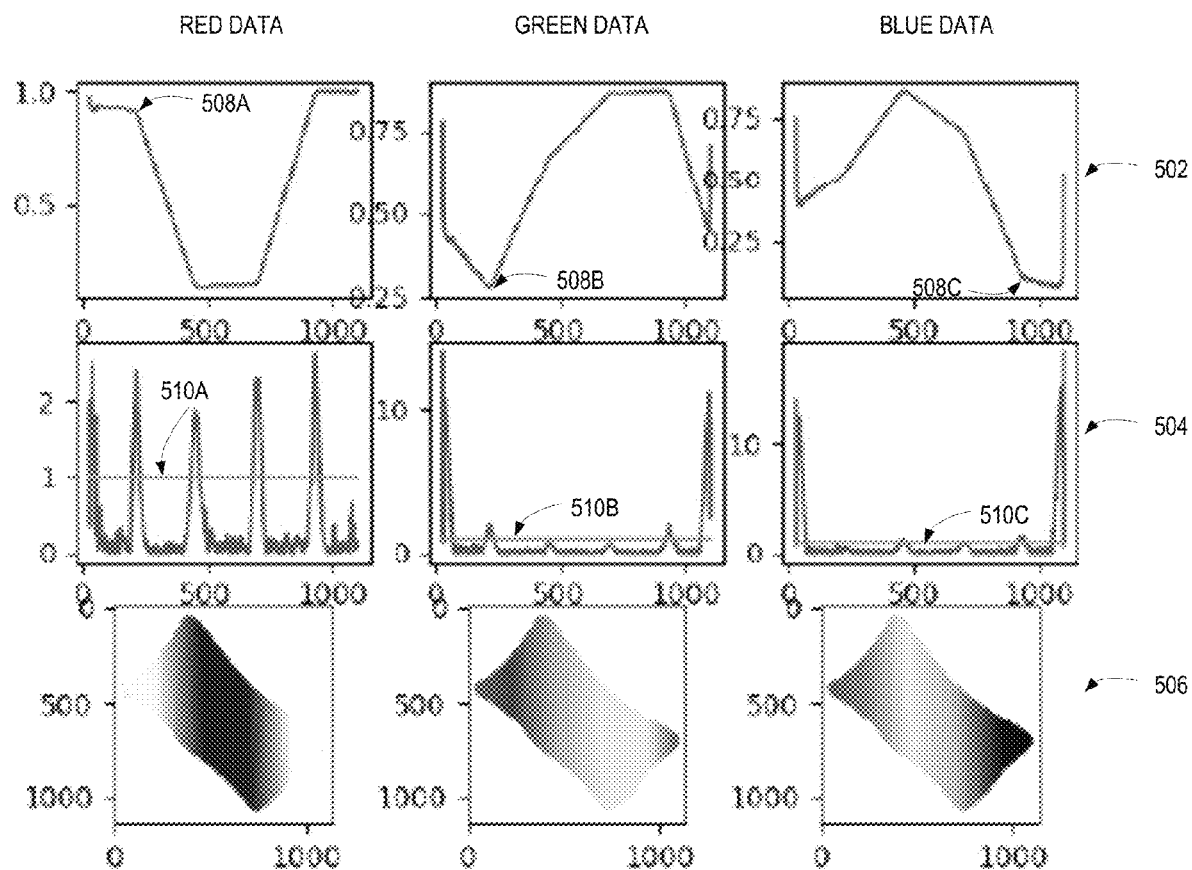
FIG. 5 illustrates color channel data generated from analyzing the pixels of a raster image in accordance with one or more embodiments.

FIG. 5 illustrates color channel data generated from analyzing the pixels of a raster image in accordance with one or more embodiments. The color channel data in FIG. 5 includes plots based on average color values determined for each pixel point along the direction of the gradient vector for the rotated raster image 202 from FIG. 4. The first row 502 depicts three plots of the color profile for the red color channel, the green color channel, and the blue color channel, respectively from left to right. The second row 504 depicts the results of applying a Laplacian filter to the color profiles for the red color channel, the green color channel, and the blue color channel from the first row 502. The third row 506 depicts each of the three color channels: red, green, and blue, respectively.

For linear gradients, the colors of pixels between any two stops (e.g., $s_1$ and $s_2$) are a linear blend of the colors at the stops. The presence of a color stop can be identified by sharp changes in the slope of the color profiles for the red, green, and blue channels. For example, pixel point 508A in the red color channel, point 508B in the green color channel, and point 508C in the blue color channel in the first row 502 depict sharp changes in the slope of their respective color profiles.

In one or more embodiments, a Laplacian filter can be applied on the color profile data from the first row 502 to identify the sharp changes. For example, the locations of pixel points along the direction of the gradient where there is a sharp change in the slope of the color profile for each of the color channels are indicated by the peaks in the plots in the second row 504. Horizontal lines 510A-C in each plot in the middle row 504 represents a threshold value, where the pixel locations of peaks above the threshold value can be identified as color stops. In one or more embodiments, the threshold value can be calculated as a median value of all peaks in the color channel data for a corresponding color channel. The stops, S, can be defined as:

$$S = \{\text{Laplacian}_F([p]) \geq \tau : [p] \in \Omega\}$$

where τ is a pre-tuned hyper-parameter. In one or more embodiments, peaks in a Laplacian plot in the middle row 504 can include multiple color stops that are within close proximity. In some embodiments, to eliminate unnecessary stops, a clustering algorithm can be applied to classify color stops that are close to each other as a single stop.

Returning to FIG. 1, once the candidate color stops are identified based on the peaks in the Laplacian plot, the degree of co-linearity of the candidate color stops is determined. Three stops are co-linear if they lie on the same line in the color space. The degree of non-co-linearity of three color stops ($p_0$, $p_1$, $p_2$) can be measured by the following:

$$\text{NonCoLinearity}(p_0,p_1,p_2) := |\|C(p_1)-C(p_0)\|^2 + \|C(p_2)-C(p_0)\|^2 - \|C(p_0)-C(p_2)\|^2|$$

where the color C(p) is F([p]). In one or more embodiments, the color stops for which the degree of non-co-linearity is too small (e.g., below a threshold amount) can be eliminated as the color variation at that stop can be interpolated by the two surroundings color stops. The threshold amount can be tuned so as to allow for an increased number of color stops or to allow for a reduced number of color stops. The computed color stops 116 to re-create the linear gradient is identified after any co-linear stops and/or closely co-linear color stops are eliminated from the candidate color stops.

Figure 6:
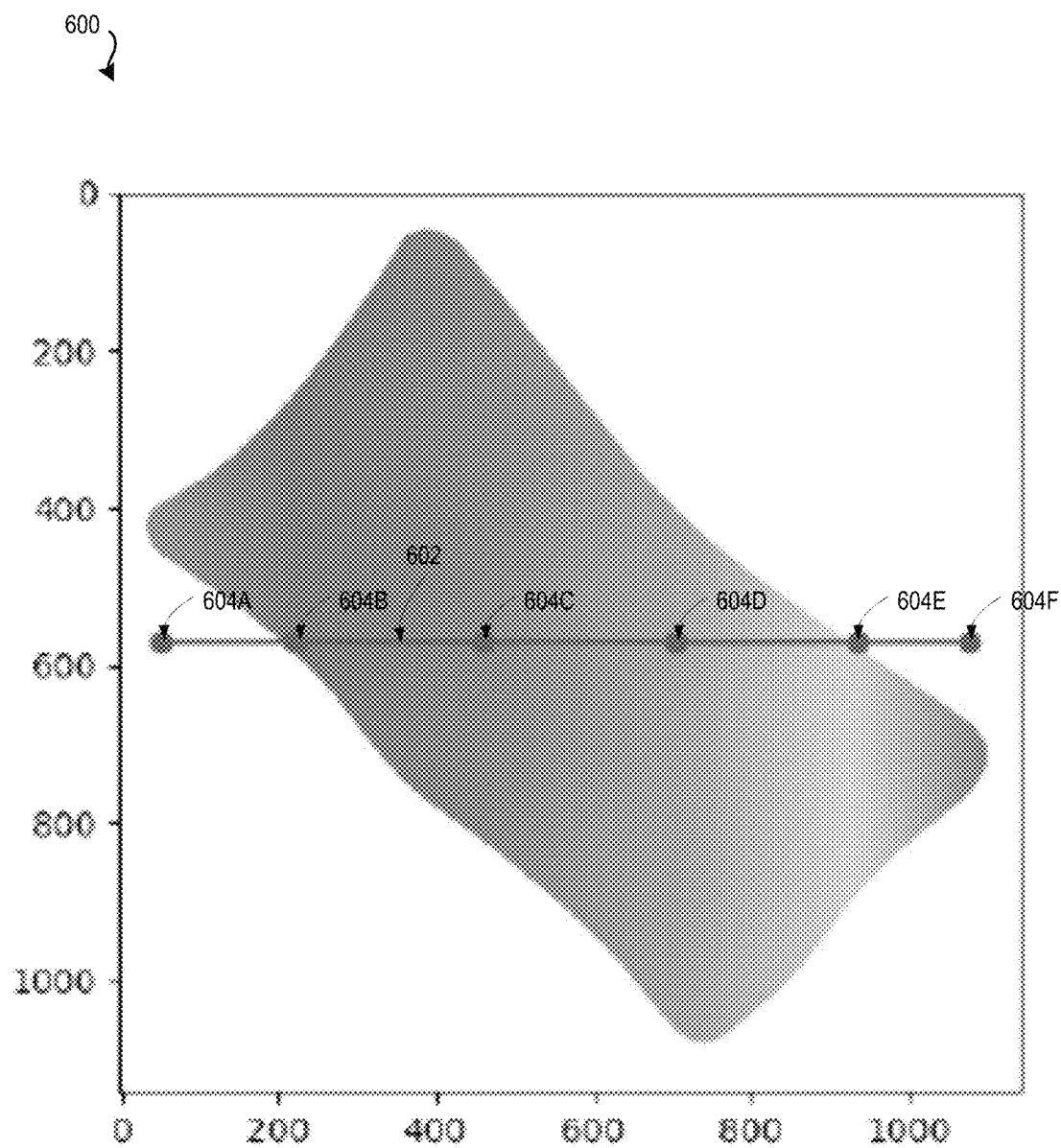
FIG. 6 illustrates computed color stops to reconstruct a linear gradient in accordance with one or more embodiments.

FIG. 6 illustrates computed color stops to reconstruct a linear gradient in accordance with one or more embodiments. As illustrated in FIG. 6, the pixel analyzing module has determined a plurality of color stops 604A-F along a gradient vector 602 using the generated color channel data, as described above with respect to FIG. 5.

After the pixel analyzing module 114 determines the computed color stops 116, the computed color stops 116 are sent to a gradient generating module 118, as shown at numeral 7. In one or more embodiments, the gradient generating module 118 uses the color stops to generate reconstructed linear gradient 120, at numeral 8. In one or more embodiments, the gradient generating module 118 can use the computed color stops 116 to generate a new vector graphic that includes the reconstructed linear gradient 120, which can then be rasterized. In some embodiments, the gradient generating module 118 can use the computed color stops 116 to generate a gradient vector that includes a gradient direction and the location and colors assigned to each color stop along the gradient vector.

Figure 7:
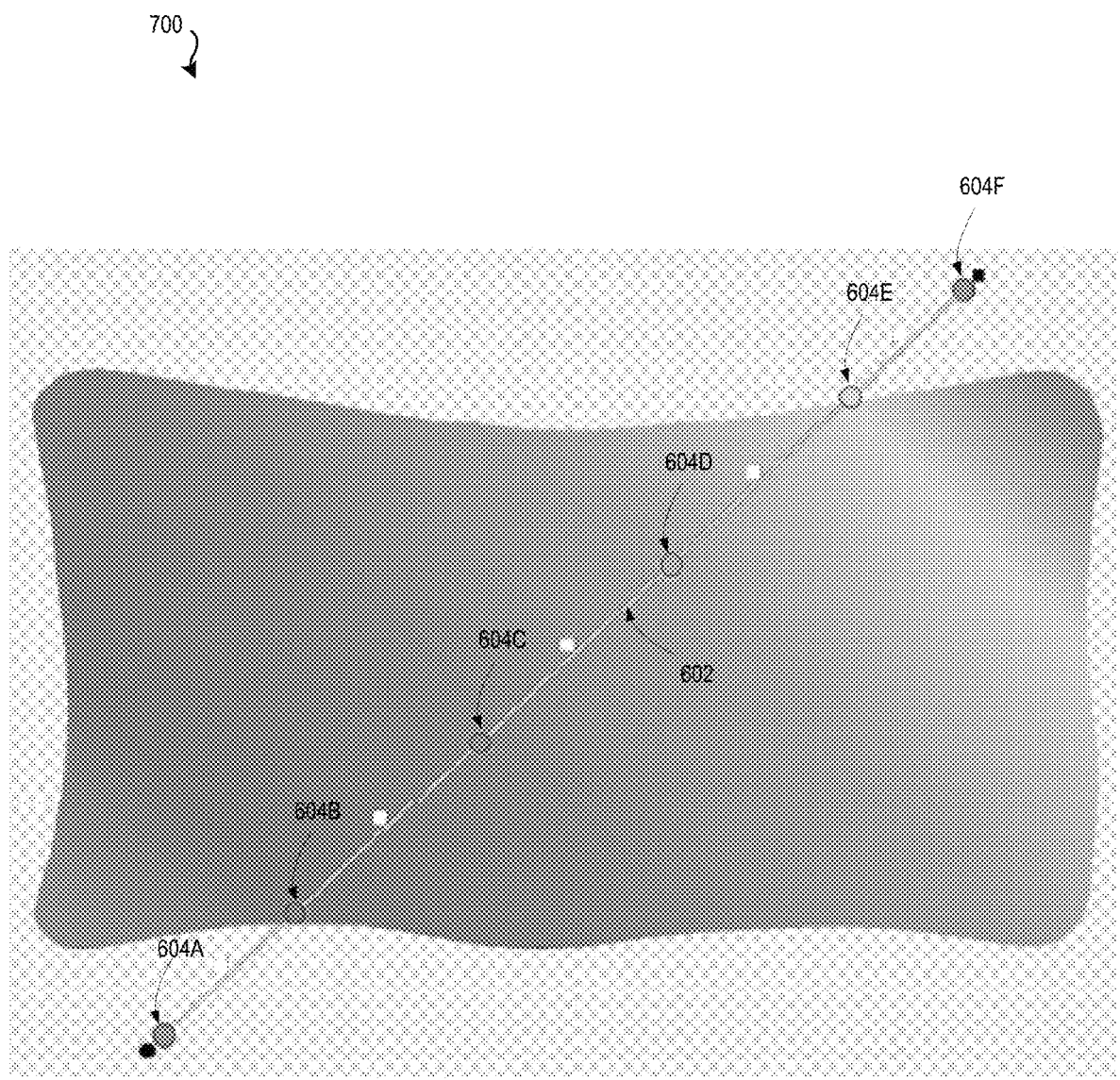
FIG. 7 illustrates an example reconstructed linear gradient generated by a digital design system in accordance with one or more embodiments.

FIG. 7 illustrates an example reconstructed linear gradient 700 generated by a digital design system in accordance with one or more embodiments. As illustrated in FIG. 7, the reconstructed linear gradient 700 is defined by a gradient vector 602 that includes a plurality of color stops 604A-F determined by the pixel analyzing module 114. In one or more embodiments, the reconstructed linear gradient 700 can be compared to the original linear gradient in the raster image (e.g., raster image 108 from FIG. 1) by checking whether the pixel-wise difference (e.g., L2-norm) of the reconstructed linear gradient 120 with respect to the gradient in the raster image 108 is within an acceptable, predefined limit.

In one or more embodiments, the digital design system 102 provides an output 130, including the reconstructed linear gradient 120, as shown at numeral 9. In one or more embodiments, after the process described above in numerals 1-8, the output 130 is sent to the user or computing device that initiated the linear gradient reconstruction process with the digital design system 102, to another computing device associated with the user or another user, or to another system or application. For example, after the process described above in numerals 1-9, the gradient vector and/or reconstructed linear gradient 120 constructed from the gradient vector can be displayed in a user interface of a computing device. A user can then apply the reconstructed linear gradient 120 to a vector graphic.

Figure 8:
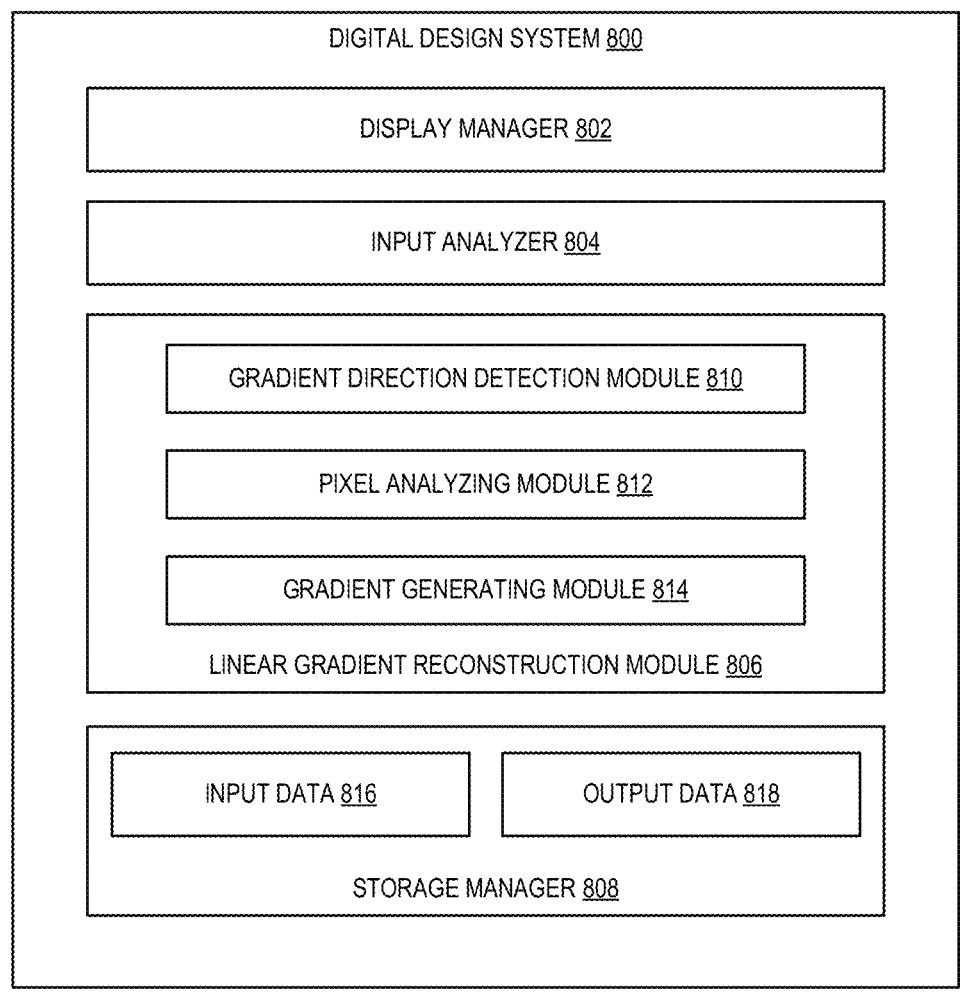
FIG. 8 illustrates a schematic diagram of a digital design system in accordance with one or more embodiments.

FIG. 8 illustrates a schematic diagram of a digital design system (e.g., "digital design system" described above) in accordance with one or more embodiments. As shown, the digital design system 800 may include, but is not limited to, a display manager 802, an input analyzer 804, a linear gradient reconstruction module 806, and a storage manager 808. As shown, the linear gradient reconstruction module 806 includes a gradient direction detection module 810, a pixel analyzing model 812, and a gradient generating module 814. The storage manager 808 includes input data 816 and output data 818.

As illustrated in FIG. 8, the digital design system 800 includes a display manager 802. In one or more embodiments, the display manager 802 identifies, provides, manages, and/or controls a user interface provided on a touch screen or other device. Examples of displays include interactive whiteboards, graphical user interfaces (or simply "user interfaces") that allow a user to view and interact with content items, or other items capable of display on a touch screen. For example, the display manager 802 may identify, display, update, or otherwise provide various user interfaces that include one or more display elements in various layouts. In one or more embodiments, the display manager 802 can identify a display provided on a touch screen or other types of displays (e.g., including monitors, projectors, headsets, etc.) that may be interacted with using a variety of input devices. For example, a display may include a graphical user interface including one or more display elements capable of being interacted with via one or more touch gestures or other types of user inputs (e.g., using a stylus, a mouse, or other input devices). Display elements include, but are not limited to buttons, text boxes, menus, thumbnails, scroll bars, hyperlinks, etc.

As further illustrated in FIG. 8, the digital design system 800 also includes an input analyzer 804. The input analyzer 804 analyzes an input received by the digital design system 800 to identify a raster image that includes a linear gradient.

As further illustrated in FIG. 8, the digital design system 800 also includes a linear gradient reconstruction module 806. The linear gradient reconstruction module 806 include a gradient direction detection module 810, a pixel analyzing model 812, and a gradient generating module 814. The gradient direction detection module 810 is configured to determine whether an input image (e.g., a raster image) includes a linear gradient and then determine the direction of the linear gradient. Using color channel gradient vector fields that indicate directions of change in color intensity for each of the color channels, the gradient direction detection module 810 can the gradient vector representing the direction of the linear gradient by combining, or concatenating, the vector fields for each of the color channels and then determining the direction that best matches the direction of the arrows across the three color channels. The gradient vector can be represented by a vector and an angle with respect to an axis.

As further illustrated in FIG. 8, the linear gradient reconstruction module 806 also includes pixel analyzing module 812 configured to compute the color stops that most closely reproduce the linear gradient. The pixel analyzing module 812 analyzes the column of pixels at each pixel point along the direction of the linear gradient to determine the average color value at each point. Using the average color value, the pixel analyzing module 812 can determine the locations of changes in color profile of each of the color channels as initial candidate locations of the color stops that reproduce the linear gradient from the input raster image. The pixel analyzing module 812 can then determine a final set of color stop locations from the candidate locations by eliminating any co-linear color stops (e.g., color stops whose colors can be reproduced by interpolating surrounding color stops).

As further illustrated in FIG. 8, the linear gradient reconstruction module 806 also includes gradient generating module 814 configured to generate an output representing the reconstructed linear gradient. For example, the gradient generating module 814 can use the computed color stops to generate a new vector graphic or raster image that includes the reconstructed linear gradient. In some embodiments, the gradient generating module 814 can use the computed color stops to generate a gradient vector that includes a gradient direction and the location and colors assigned to each color stop along the gradient vector.

As further illustrated in FIG. 8, the storage manager 808 includes input data 816 and output data 818. In particular, the input data 816 may include an input raster image that includes a linear gradient received by the digital design system 800. In one or more embodiments, the output data 818 may include a gradient vector with a plurality of computed color stops generated by the digital design system 800 based on the input raster image, where the gradient vector can be used to generate a linear gradient on new raster images. In some embodiments, the output data 818 can include a generated vector graphic with the reconstructed linear gradient generated using the gradient vector and the plurality of computed color stops, which can then be rasterized.

Each of the components 802-808 of the digital design system 800 and their corresponding elements (as shown in FIG. 8) may be in communication with one another using any suitable communication technologies. It will be recognized that although components 802-808 and their corresponding elements are shown to be separate in FIG. 8, any of components 802-808 and their corresponding elements may be combined into fewer components, such as into a single facility or module, divided into more components, or configured into different components as may serve a particular embodiment.

The components 802-808 and their corresponding elements can comprise software, hardware, or both. For example, the components 802-808 and their corresponding elements can comprise one or more instructions stored on a computer-readable storage medium and executable by processors of one or more computing devices. When executed by the one or more processors, the computer-executable instructions of the digital design system 800 can cause a client device and/or a server device to perform the methods described herein. Alternatively, the components 802-808 and their corresponding elements can comprise hardware, such as a special purpose processing device to perform a certain function or group of functions. Additionally, the components 802-808 and their corresponding elements can comprise a combination of computer-executable instructions and hardware.

Furthermore, the components 802-808 of the digital design system 800 may, for example, be implemented as one or more stand-alone applications, as one or more modules of an application, as one or more plug-ins, as one or more library functions or functions that may be called by other applications, and/or as a cloud-computing model. Thus, the components 802-808 of the digital design system 800 may be implemented as a stand-alone application, such as a desktop or mobile application. Furthermore, the components 802-808 of the digital design system 800 may be implemented as one or more web-based applications hosted on a remote server. Alternatively, or additionally, the components of the digital design system 800 may be implemented in a suit of mobile device applications or "apps."

Figure 9:
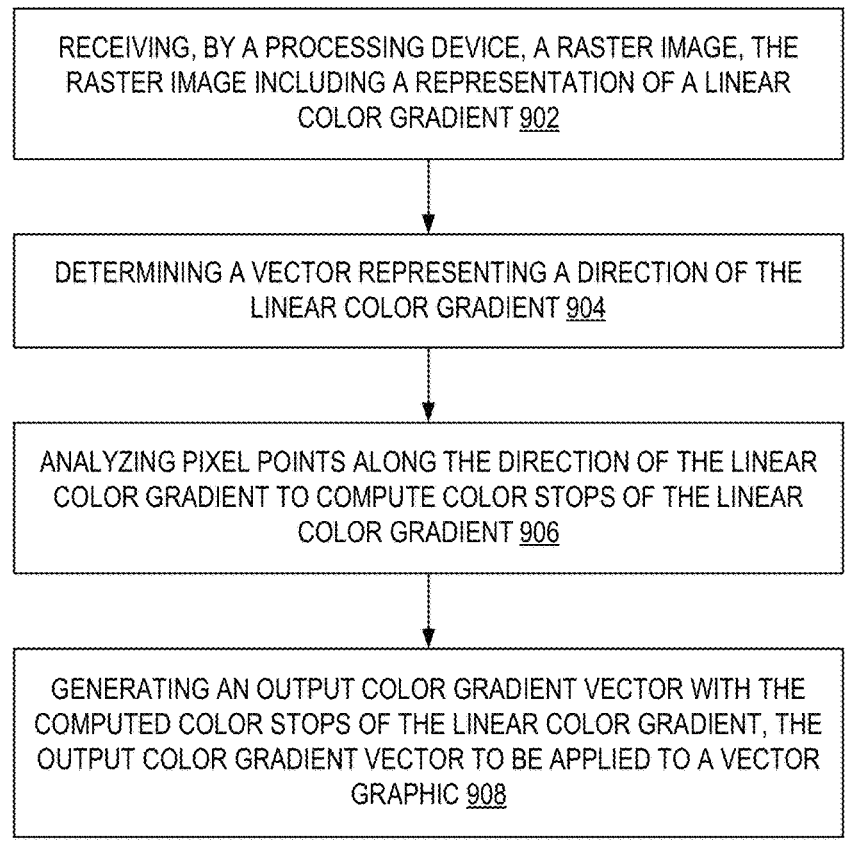
FIG. 9 illustrates a flowchart of a series of acts in a method of reconstructing a linear gradient from a raster image by a digital design system in accordance with one or more embodiments.

FIGS. 1-8, the corresponding text, and the examples, provide a number of different systems and devices that allow a digital design system to reconstruct a linear gradient from an input raster image. In addition to the foregoing, embodiments can also be described in terms of flowcharts comprising acts and steps in a method for accomplishing a particular result. For example, FIGS. 9 and 10 illustrate flowcharts of exemplary methods in accordance with one or more embodiments. The methods described in relation to FIGS. 9 and 10 may be performed with less or more steps/acts or the steps/acts may be performed in differing orders. Additionally, the steps/acts described herein may be repeated or performed in parallel with one another or in parallel with different instances of the same or similar steps/acts.

FIG. 9 illustrates a flowchart of a series of acts in a method of reconstructing a linear gradient from a raster image by a digital design system in accordance with one or more embodiments. In one or more embodiments, the method 900 is performed in a digital medium environment that includes the digital design system 800. The method 900 is intended to be illustrative of one or more methods in accordance with the present disclosure and is not intended to limit potential embodiments. Alternative embodiments can include additional, fewer, or different steps than those articulated in FIG. 9.

As shown in FIG. 9, the method 900 includes an act 902 of receiving, by a processing device, a raster image, the raster image including a representation of a linear color gradient. In one or more embodiments, the digital design system receives the raster image from a user (e.g., via a computing device). In one or more embodiments, the user may select the raster image in an application, or the user may submit the raster image to a web service or an application configured to receive inputs.

As shown in FIG. 9, the method 900 also includes an act 904 of determining a vector representing a direction of the linear color gradient. In one or more embodiments, the processing device generates color channel data for the input raster image, where the color channel data includes vector fields for each color channel. The vector fields represent the directions of change of a color intensity for a corresponding color channel. The processing device then aggregates the vector fields for each color channel to determine the vector representing the direction of the linear color gradient, e.g., by determining the single direction that best matches the direction of the vectors across the three color channels.

As shown in FIG. 9, the method 900 also includes an act 906 of analyzing pixel points along the direction of the linear color gradient to compute color stops of the linear color gradient. In one or more embodiments, the processing device determines average pixel column color values of the linear color gradient.

In some embodiments, the average pixel column color values is determined by first rotating the input raster image to align the vector representing the direction of the linear color gradient with a first axis. Then, for each pixel point along the first axis (e.g., along the direction of the determined vector), the processing device determines color values associated with pixels in a pixel column parallel to a second axis that is perpendicular to the first axis. For example, if the input raster image has been rotated to align the linear color gradient with the x-axis, the pixel columns would be in parallel with the y-axis. The processing device then calculates an average pixel column color value for each pixel column based on the determined color values of the pixels in the column. The processing device then aggregates the average pixel column color values for each point along the first axis to generate the average pixel column color values for the input raster image.

In other embodiments, the average pixel column color values is determined without rotating the input raster image. In such embodiments, for each pixel point along the vector representing the direction of the linear color gradient, the processing device determines color values associated with pixels in a pixel column perpendicular to the vector representing the direction of the linear color gradient and calculates an average pixel column color value for each pixel column based on the determined color values for the pixels in the pixel column. The processing device then aggregates the average pixel column color values for each point along the direction of the linear color gradient to generate the average pixel column color values for the input raster image.

After determining the average pixel column color values of the linear color gradient, the processing device uses the average pixel column color values to generate color channel data for each pixel point along the vector representing the direction of the linear color gradient. In one or more embodiments, a Laplacian filter is applied to the color channel data to generate data indicating a rate of change of the linear color gradient for each color channel. The color stops can then be identified at the location of peaks in the filtered color channel data, where the peaks indicate the greatest change in color values. In one or more embodiments, a threshold is calculated as a median value of all peaks in the color channel data for a corresponding color channel, where any peaks below the threshold are not selected as color stops.

In one or more embodiments, the peak identified above the threshold can represent an initial or candidate set of color stop locations. In some embodiments, the candidate set of color stop locations can be reduced by applying a clustering algorithm and/or eliminating color stop locations that are co-linear with neighboring locations.

As shown in FIG. 9, the method 900 also includes an act 908 of generating an output color gradient vector with the computed color stops of the linear color gradient, the output color gradient vector to be applied to a vector graphic. In some embodiments, the processing device uses the color stops locations to generate a gradient vector that includes a gradient direction and the location and colors assigned to each color stop along the gradient vector. In other embodiments, the processing device can use the color stops to generate a vector graphic that includes the reconstructed linear gradient, which can be rasterized.

FIG. 10 illustrates a flowchart of a series of acts in a method of reconstructing a linear gradient from a raster image by a digital design system in accordance with one or more embodiments. In one or more embodiments, the method 1000 is performed in a digital medium environment that includes the digital design system 800. The method 1000 is intended to be illustrative of one or more methods in accordance with the present disclosure and is not intended to limit potential embodiments. Alternative embodiments can include additional, fewer, or different steps than those articulated in FIG. 10.

As shown in FIG. 10, the method 1000 includes an act 1002 of receiving a request to convert a raster image to a vector graphic. In one or more embodiments, the digital design system receives the raster image from a user (e.g., via a computing device). In one or more embodiments, the user may select the raster image in an application, or the user may submit the raster image to a web service or an application configured to receive inputs.

As shown in FIG. 10, the method 1000 also includes an act 1004 of identifying a region of the raster image, the region including a representation of a linear color gradient.

In one or more embodiments, a region of the raster image can be identified responsive to a selection of the region (e.g., via a user input). In other embodiments, an algorithm can be used to identify and select a region of the raster image that includes the linear color gradient.

As shown in FIG. 10, the method 1000 also includes an act 1006 of computing color stops of the linear color gradient based on a vector representing a direction of the linear color gradient, and pixel points along the direction of the linear color gradient. In one or more embodiments, the processing device generates color channel data for the input raster image to determine the vector representing the direction of the linear color gradient, where the color channel data includes vector fields for each color channel. The vector fields represent the directions of change of a color intensity for a corresponding color channel. The processing device then aggregates the vector fields for each color channel to determine the vector representing the direction of the linear color gradient, e.g., by determining the single direction that best matches the direction of the vectors across the three color channels.

The processing device further analyzes pixel points along the direction of the linear color gradient to compute color stops of the linear color gradient. In one or more embodiments, the processing device determines average pixel column color values of the linear color gradient.

In some embodiments, the average pixel column color values is determined by first rotating the input raster image to align the vector representing the direction of the linear color gradient with a first axis. Then, for each pixel point along the first axis (e.g., along the direction of the determined vector), the processing device determines color values associated with pixels in a pixel column parallel to a second axis that is perpendicular to the first axis. For example, if the input raster image has been rotated to align the linear color gradient with the x-axis, the pixel columns would be in parallel with the y-axis. The processing device then calculates an average pixel column color value for each pixel column based on the determined color values of the pixels in the column. The processing device then aggregates the average pixel column color values for each point along the first axis to generate the average pixel column color values for the input raster image.

In other embodiments, the average pixel column color values is determined without rotating the input raster image. In such embodiments, for each pixel point along the vector representing the direction of the linear color gradient, the processing device determines color values associated with pixels in a pixel column perpendicular to the vector representing the direction of the linear color gradient and calculates an average pixel column color value for each pixel column based on the determined color values for the pixels in the pixel column. The processing device then aggregates the average pixel column color values for each point along the direction of the linear color gradient to generate the average pixel column color values for the input raster image.

After determining the average pixel column color values of the linear color gradient, the processing device uses the average pixel column color values to generate color channel data for each pixel point along the vector representing the direction of the linear color gradient. In one or more embodiments, a Laplacian filter is applied to the color channel data to generate data indicating a rate of change of the linear color gradient for each color channel. The color stops can then be identified at the location of peaks in the filtered color channel data, where the peaks indicate the greatest change in color values. In one or more embodiments, a threshold is calculated as a median value of all peaks in the color channel data for a corresponding color channel, where any peaks below the threshold are not selected as color stops.

In one or more embodiments, the peak identified above the threshold can represent an initial or candidate set of color stop locations. In some embodiments, the candidate set of color stop locations can be reduced by applying a clustering algorithm and/or eliminating color stop locations that are co-linear with neighboring locations.

As shown in FIG. 10, the method 1000 also includes an act 1008 of creating a vector graphic including the linear color gradient using the computed color stops. In some embodiments, the processing device uses the color stops locations to generate a gradient vector that includes a gradient direction and the location and colors assigned to each color stop along the gradient vector. In other embodiments, the processing device can use the color stops to generate a vector graphic that includes the reconstructed linear gradient.

Figure 11:
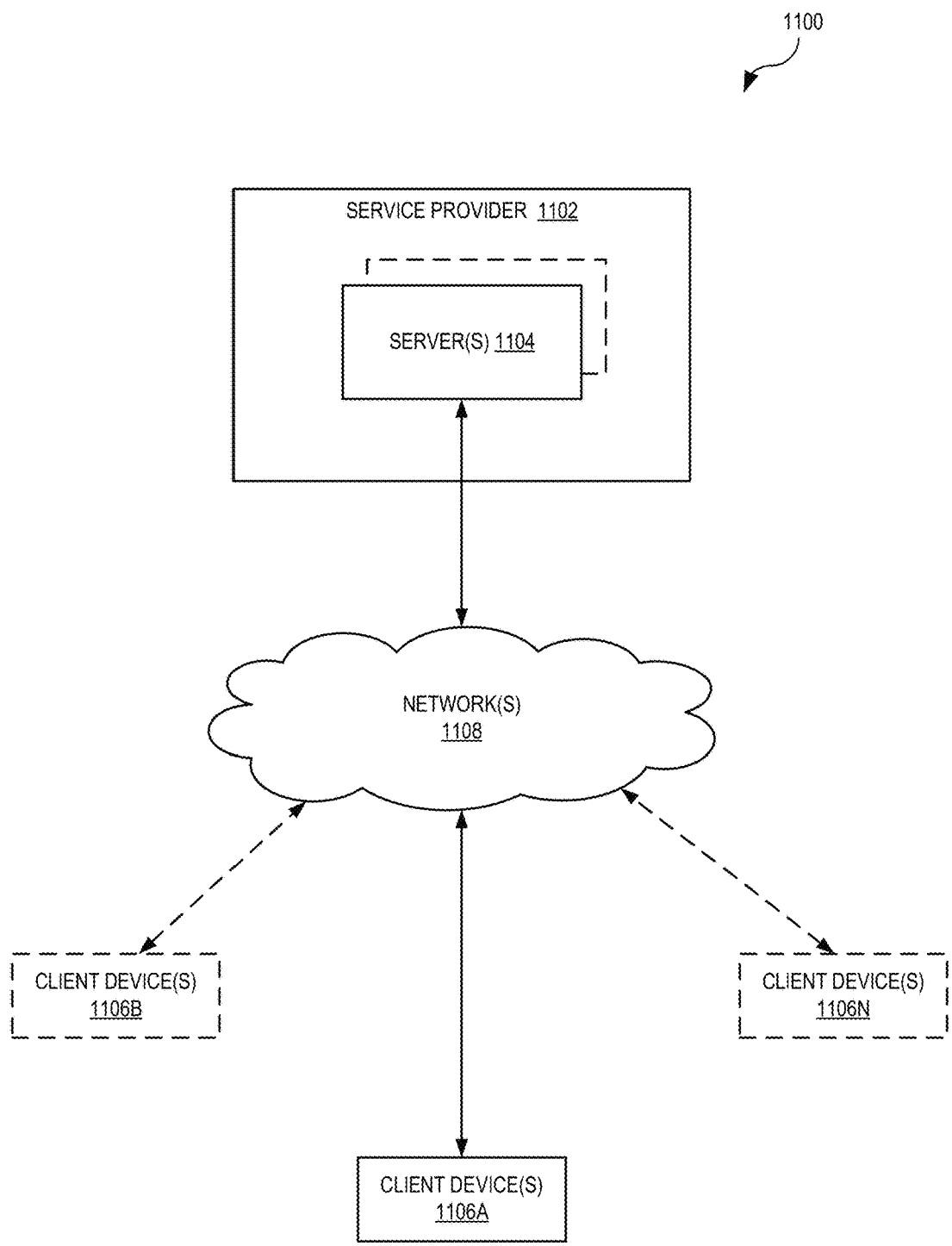
FIG. 11 illustrates a schematic diagram of an exemplary environment in which the digital design system can operate in accordance with one or more embodiments.

FIG. 11 illustrates a schematic diagram of an exemplary environment 1100 in which the digital design system 800 can operate in accordance with one or more embodiments. In one or more embodiments, the environment 1100 includes a service provider 1102 which may include one or more servers 1104 connected to a plurality of client devices 1106A-1106N via one or more networks 1108. The client devices 1106A-1106N, the one or more networks 1108, the service provider 1102, and the one or more servers 1104 may communicate with each other or other components using any communication platforms and technologies suitable for transporting data and/or communication signals, including any known communication technologies, devices, media, and protocols supportive of remote data communications, examples of which will be described in more detail below with respect to FIG. 12.

Although FIG. 11 illustrates a particular arrangement of the client devices 1106A-1106N, the one or more networks 1108, the service provider 1102, and the one or more servers 1104, various additional arrangements are possible. For example, the client devices 1106A-1106N may directly communicate with the one or more servers 1104, bypassing the network 1108. Or alternatively, the client devices 1106A-1106N may directly communicate with each other. The service provider 1102 may be a public cloud service provider which owns and operates their own infrastructure in one or more data centers and provides this infrastructure to customers and end users on demand to host applications on the one or more servers 1104. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1104. In some embodiments, the service provider may be a private cloud provider which maintains cloud infrastructure for a single organization. The one or more servers 1104 may similarly include one or more hardware servers, each with its own computing resources, which are divided among applications hosted by the one or more servers for use by members of the organization or their customers.

Similarly, although the environment 1100 of FIG. 11 is depicted as having various components, the environment 1100 may have additional or alternative components. For example, the environment 1100 can be implemented on a single computing device with the digital design system 800. In particular, the digital design system 800 may be implemented in whole or in part on the client device 1106A. Alternatively, in some embodiments, the environment 1100 is implemented in a distributed architecture across multiple computing devices.

As illustrated in FIG. 11, the environment 1100 may include client devices 1106A-1106N. The client devices 1106A-1106N may comprise any computing device. For example, client devices 1106A-1106N may comprise one or more personal computers, laptop computers, mobile devices, mobile phones, tablets, special purpose computers, TVs, or other computing devices, including computing devices described below with regard to FIG. 12. Although three client devices are shown in FIG. 11, it will be appreciated that client devices 1106A-1106N may comprise any number of client devices (greater or smaller than shown).

Moreover, as illustrated in FIG. 11, the client devices 1106A-1106N and the one or more servers 1104 may communicate via one or more networks 1108. The one or more networks 1108 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1108 may be any suitable network over which the client devices 1106A-1106N may access the service provider 1102 and server 1104, or vice versa. The one or more networks 1108 will be discussed in more detail below with regard to FIG. 12.

In addition, the environment 1100 may also include one or more servers 1104. The one or more servers 1104 may generate, store, receive, and transmit any type of data, including input data 816 and output data 818 or other information. For example, a server 1104 may receive data from a client device, such as the client device 1106A, and send the data to another client device, such as the client device 1106B and/or 1106N. The server 1104 can also transmit electronic messages between one or more users of the environment 1100. In one example embodiment, the server 1104 is a data server. The server 1104 can also comprise a communication server or a web-hosting server. Additional details regarding the server 1104 will be discussed below with respect to FIG. 12.

As mentioned, in one or more embodiments, the one or more servers 1104 can include or implement at least a portion of the digital design system 800. In particular, the digital design system 800 can comprise an application running on the one or more servers 1104 or a portion of the digital design system 800 can be downloaded from the one or more servers 1104. For example, the digital design system 800 can include a web hosting application that allows the client devices 1106A-1106N to interact with content hosted at the one or more servers 1104. To illustrate, in one or more embodiments of the environment 1100, one or more client devices 1106A-1106N can access a webpage supported by the one or more servers 1104. In particular, the client device 1106A can run a web application (e.g., a web browser) to allow a user to access, view, and/or interact with a webpage or website hosted at the one or more servers 1104.

Upon the client device 1106A accessing a webpage or other web application hosted at the one or more servers 1104, in one or more embodiments, the one or more servers 1104 can provide a user of the client device 1106A with an interface to provide inputs, including an input raster image that includes a linear gradient. Upon receiving the input raster image with the linear gradient, the one or more servers 1104 can automatically perform the methods and processes described above to generate a reconstructed linear gradient representing the gradient in the input raster image.

As just described, the digital design system 800 may be implemented in whole, or in part, by the individual elements 1102-1108 of the environment 1100. It will be appreciated that although certain components of the digital design system 800 are described in the previous examples with regard to particular elements of the environment 1100, various alternative implementations are possible. For instance, in one or more embodiments, the digital design system 800 is implemented on any of the client devices 1106A-1106N. Similarly, in one or more embodiments, the digital design system 800 may be implemented on the one or more servers 1104. Moreover, different components and functions of the digital design system 800 may be implemented separately among client devices 1106A-1106N, the one or more servers 1104, and the network 1108.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
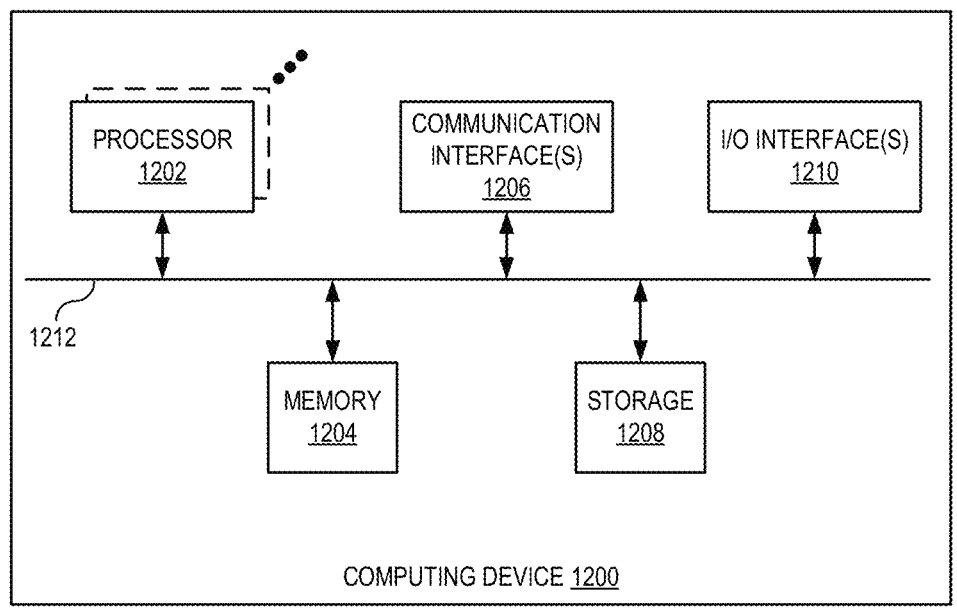
FIG. 12 illustrates a block diagram of an exemplary computing device in accordance with one or more embodiments.

FIG. 12 illustrates, in block diagram form, an exemplary computing device 1200 that may be configured to perform one or more of the processes described above. One will appreciate that one or more computing devices such as the computing device 1200 may implement the digital design system 800. As shown by FIG. 12, the computing device can comprise a processor 1202, memory 1204, one or more communication interfaces 1206, a storage device 1208, and one or more input or output ("I/O") devices/interfaces 1210. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1208 and decode and execute them. In various embodiments, the processor(s) 1202 may include one or more central processing units (CPUs), graphics processing units (GPUs), field programmable gate arrays (FPGAs), systems on chip (SoC), or other processor(s) or combinations of processors.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1204 may be internal or distributed memory.

The computing device 1200 can further include one or more communication interfaces 1206. A communication interface 1206 can include hardware, software, or both. The communication interface 1206 can provide one or more interfaces for communication (such as, for example, packet-based communication) between the computing device and one or more other computing devices 1200 or one or more networks. As an example, and not by way of limitation, communication interface 1206 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

The computing device 1200 includes a storage device 1208 includes storage for storing data or instructions. As an example, and not by way of limitation, storage device 1208 can comprise a non-transitory storage medium described above. The storage device 1208 may include a hard disk drive (HDD), flash memory, a Universal Serial Bus (USB) drive or a combination these or other storage devices. The computing device 1200 also includes one or more I/O devices/interfaces 1210, which are provided to allow a user to provide input to (such as user strokes), receive output from, and otherwise transfer data to and from the computing device 1200. These I/O devices/interfaces 1210 may include a mouse, keypad or a keyboard, a touch screen, camera, optical scanner, network interface, modem, other known I/O devices or a combination of such I/O devices/interfaces 1210. The touch screen may be activated with a stylus or a finger.

The I/O devices/interfaces 1210 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1210 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
receiving, by a processing device, a raster image, the raster image including a representation of a linear color gradient;
determining a vector representing a direction of the linear color gradient, wherein the direction of the linear color gradient is a combination of a direction of each color channel of a pixel in the linear color gradient;
in response to determining that the direction of each color channel of the pixel in the linear color gradient is aligned, analyzing pixel points along the direction of the linear color gradient to compute color stops of the linear color gradient; and
generating an output color gradient vector with the computed color stops of the linear color gradient, the output color gradient vector to be applied to a vector graphic.

2. The method of claim 1, wherein analyzing each pixel point along the direction of the linear color gradient to compute the color stops of the linear color gradient comprises:
determining average pixel column color values of the linear color gradient;
generating color channel data for each pixel point along the vector representing the direction of the linear color gradient from the determined average pixel column color values; and
identifying the color stops along the vector representing the direction of the linear color gradient at locations of peaks in the generated color channel data, the locations of peaks indicating changes in color values.

3. The method of claim 2, wherein determining the average pixel column color values of the linear color gradient comprises:
rotating the raster image to align the vector representing the direction of the linear color gradient with a first axis;
for each pixel point along the first axis,
determining color values associated with pixels in a pixel column parallel to a second axis, the second axis perpendicular to the first axis, and
calculating an average pixel column color value for the pixel column based on the determined color values; and
generating the average pixel column color values of the linear color gradient by aggregating the average pixel column color value for each pixel point.

4. The method of claim 2, wherein determining the average pixel column color values of the linear color gradient comprises:
for each pixel point along the vector representing the direction of the linear color gradient,
determining color values associated with pixels in a pixel column perpendicular to the vector representing the direction of the linear color gradient, and
calculating an average pixel column color value for the pixel column based on the determined color values; and
generating the average pixel column color values of the linear color gradient by aggregating the average pixel column color value for each pixel point.

5. The method of claim 2, wherein identifying the color stops along the vector representing the direction of the linear color gradient at the locations of the peaks indicating the changes in the color values further comprises:
applying a Laplacian filter to the color channel data to generate data indicating a rate of change of the linear color gradient for each color channel;
identifying a first set of locations of the peaks above a threshold value;
applying a clustering algorithm to the first set of locations of the peaks; and
generating a second set of locations of the peaks by eliminating locations from the first set of locations that are co-linear to neighboring locations.

6. The method of claim 5, wherein the threshold value for a color channel is calculated as a median value of all peaks in the color channel data for a corresponding color channel.

7. The method of claim 1, wherein determining the vector representing the direction of the linear color gradient comprises:

generating color channel data for the raster image, the color channel data including vector fields for each color channel indicating directions of change of a corresponding color;
aggregating the vector fields for each color channel to determine the vector representing the direction of the linear color gradient.

8. A non-transitory computer-readable storage medium storing executable instructions, which when executed by a processing device, cause the processing device to perform operations comprising:
receiving, by a processing device, a raster image, the raster image including a representation of a linear color gradient;
determining a vector representing a direction of the linear color gradient, wherein the direction of the linear color gradient is a combination of a direction of each color channel of a pixel in the linear color gradient;
in response to determining that the direction of each color channel of the pixel in the linear color gradient is aligned, analyzing pixel points along the direction of the linear color gradient to compute color stops of the linear color gradient; and
generating an output color gradient vector with the computed color stops of the linear color gradient, the output color gradient vector to be applied to a vector graphic.

9. The non-transitory computer-readable storage medium of claim 8, wherein to analyze each pixel point along the direction of the linear color gradient to compute the color stops of the linear color gradient the instructions further cause the processing device to perform operations comprising:
determining average pixel column color values of the linear color gradient;
generating color channel data for each pixel point along the vector representing the direction of the linear color gradient from the determined average pixel column color values; and
identifying the color stops along the vector representing the direction of the linear color gradient at locations of peaks in the generated color channel data, the locations of peaks indicating changes in color values.

10. The non-transitory computer-readable storage medium of claim 9, wherein to determine the average pixel column color values of the linear color gradient the instructions further cause the processing device to perform operations comprising:
rotating the raster image to align the vector representing the direction of the linear color gradient with a first axis;
for each pixel point along the first axis,
determining color values associated with pixels in a pixel column parallel to a second axis, the second axis perpendicular to the first axis, and
calculating an average pixel column color value for the pixel column based on the determined color values; and
generating the average pixel column color values of the linear color gradient by aggregating the average pixel column color value for each pixel point.

11. The non-transitory computer-readable storage medium of claim 9, wherein to determine the average pixel column color values of the linear color gradient the instructions further cause the processing device to perform operations comprising:
for each pixel point along the vector representing the direction of the linear color gradient,
determining color values associated with pixels in a pixel column perpendicular to the vector representing the direction of the linear color gradient, and
calculating an average pixel column color value for the pixel column based on the determined color values; and
generating the average pixel column color values of the linear color gradient by aggregating the average pixel column color value for each pixel point.

12. The non-transitory computer-readable storage medium of claim 9, wherein to identify the color stops along the vector representing the direction of the linear color gradient at the locations of the peaks indicating the changes in the color values the instructions further cause the processing device to perform operations comprising:
applying a Laplacian filter to the color channel data to generate data indicating a rate of change of the linear color gradient for each color channel;
identifying a first set of locations of the peaks above a threshold value;
applying a clustering algorithm to the first set of locations of the peaks; and
generating a second set of locations of the peaks by eliminating locations from the first set of locations that are co-linear to neighboring locations.

13. The non-transitory computer-readable storage medium of claim 12, wherein the threshold value for a color channel is calculated as a median value of all peaks in the color channel data for a corresponding color channel.

14. The non-transitory computer-readable storage medium of claim 8, wherein to determine the vector representing the direction of the linear color gradient the instructions further cause the processing device to perform operations comprising:
generating color channel data for the raster image, the color channel data including vector fields for each color channel indicating directions of change of a corresponding color;
aggregating the vector fields for each color channel to determine the vector representing the direction of the linear color gradient.

15. A system comprising:
a memory component; and
a processing device coupled to the memory component, the processing device to perform operations comprising:
receiving a request to convert a raster image to a vector graphic;
identifying a region of the raster image, the region including a representation of a linear color gradient, wherein a direction of the linear color gradient is a combination of a direction of each color channel of a pixel in the linear color gradient;
in response to determining that the direction of each color channel of the pixel in the linear color gradient is aligned, computing color stops of the linear color gradient based on a vector representing the direction of the linear color gradient, and pixel points along the direction of the linear color gradient; and
creating a vector graphic including the linear color gradient using the computed color stops.

16. The system of claim 15, wherein the processing device further performs operations comprising: generating color channel data for the identified region of the raster image to determine the vector representing the direction of the linear color gradient, the color channel data including vector fields for each color channel indicating directions of change of a corresponding color.

17. The system of claim 15, wherein processing device further performs operations comprising:
  determining average pixel column color values of the linear color gradient;
  generating color channel data for each pixel point along the vector representing the direction of the linear color gradient from the determined average pixel column color values; and
  identifying the color stops along the vector representing the direction of the linear color gradient at locations of peaks in the generated color channel data, the locations of peaks indicating changes in color values.

18. The system of claim 17, wherein to determine the average pixel column color values of the linear color gradient the processing device further performs operations comprising:
  rotating the raster image to align the vector representing the direction of the linear color gradient with a first axis;
  for each pixel point along the first axis,
    determining color values associated with pixels in a pixel column parallel to a second axis, the second axis perpendicular to the first axis, and
    calculating an average pixel column color value for the pixel column based on the determined color values; and
  generating the average pixel column color values of the linear color gradient by aggregating the average pixel column color value for each pixel point.

19. The system of claim 17, wherein to identify the color stops along the vector representing the direction of the linear color gradient at the locations of the peaks indicating the changes in the color values the processing device further performs operations comprising:
  applying a Laplacian filter to the color channel data to generate data indicating a rate of change of the linear color gradient;
  identifying a first set of locations of the peaks above a threshold value;
  applying a clustering algorithm to the first set of locations of the peaks; and
  generating a second set of locations of the peaks by eliminating locations from the first set of locations that are co-linear to neighboring locations.

20. The system of claim 19, wherein the threshold value for a color channel is calculated as a median value of all peaks in the color channel data for a corresponding color channel.

* * * * *